United States Patent
Pikna et al.

(10) Patent No.: US 6,171,020 B1
(45) Date of Patent: Jan. 9, 2001

(54) PRESSURE ADJUSTABLE, SOIL CLEATING ATTACHMENT FOR FRONT OF BULLDOZERS

(76) Inventors: Dan Pikna; Rick Reidl, both of P.O. Box 222, Mineral City, OH (US) 44656

( * ) Notice: Under 35 U.S.C. 154(b), the term of this patent shall be extended for 0 days.

(21) Appl. No.: 09/206,103

(22) Filed: Dec. 4, 1998

(51) Int. Cl.⁷ ................................................ E01C 19/26
(52) U.S. Cl. .......................................... 404/121; 404/128
(58) Field of Search ............................ 172/40, 810, 812, 172/815, 68; 404/128, 122, 121; 37/403, 466, 903, 407

(56) References Cited

U.S. PATENT DOCUMENTS

| | | | |
|---|---|---|---|
| 1,378,743 | * 5/1921 | Warden | 404/128 |
| 3,260,179 | * 7/1966 | Moreira | 404/128 |
| 3,767,262 | * 10/1973 | Pentith | 37/403 |
| 3,989,404 | * 11/1976 | Burton | 37/403 |
| 4,019,268 | * 4/1977 | Waterman | 172/815 |
| 4,098,344 | 7/1978 | Johnson | 172/40 |
| 4,113,026 | 9/1978 | Van der Lely et al. | |
| 4,135,583 | 1/1979 | Becker | 172/802 |
| 4,193,457 | * 3/1980 | Sphar | 172/810 |
| 4,384,620 | 5/1983 | Uchida et al. | 172/815 |
| 4,411,081 | * 10/1983 | King | 404/121 |
| 4,552,226 | 11/1985 | Platter | 172/815 |
| 4,878,544 | 11/1989 | Barnhart | 172/40 |
| 4,924,945 | 5/1990 | Mork | 172/197 |
| 5,024,280 | 6/1991 | Mork | 172/197 |
| 5,450,910 | * 9/1995 | Strzyzewski | 37/403 |
| 5,713,418 | 2/1998 | Warren et al. | 172/40 |

\* cited by examiner

*Primary Examiner*—Thomas B. Will
*Assistant Examiner*—Kristine M. Markovich
(74) *Attorney, Agent, or Firm*—John D. Gugliotta

(57) ABSTRACT

A pressure adjustable, soil-cleating attachment for front of bulldozers, designed for erosion control by cleating the ground in the area between the bull dozer tracks, thus facilitating one pass cleating of the entire area under the bull dozer. The present invention may also be used to crimp straw and when reseeding land. A cleated roller is connected to two support arms, which releasably mount to the bottom of the bulldozer push arms. A protective shield is connected to each support arm, and covers the upper visible portion of the roller as the roller rotates, thereby reducing flying debris during cleating of the ground. Roller stabilization arms are designed to compensate for movement of the support arms as the bottom of the bulldozer blade wears during use.

9 Claims, 4 Drawing Sheets

PRESSURE ADJUSTABLE, SOIL CLEATING ATTACHMENT FOR FRONT OF BULLDOZERS

RELATED APPLICATIONS AND DISCLOSURES

The present invention was first disclosed in a Disclosure Document filed on Apr. 25, 1998. There were no previously filed, nor any copending applications anywhere in the world.

BACKGROUND OF THE INVENTION

1. Field of the Invention

The present invention relates generally to industrial soil compaction devices and, more particularly, to pressure adjustable, soil-cleating attachment for front of bulldozers.

2. Description of the Related Art

Environmental concerns over the growing number and size of landfills have resulted in concerted efforts to maximize their efficiency. Among these efforts, it is a common practice to compact and cleat the refuse and soil in the landfill in order to minimize soil erosion caused by water runoff.

Cleating the landfill surface creates divots that catch the water, preventing it from collecting into streams that rapidly erodes the soil as it runs. Typically, the compacting and cleating are achieved by using specialized tracks on the bulldozers that are used to organize and manage the landfill.

However, there is a drawback to this practice in that the area between the bulldozer tracks is left untouched as it passes and, as a result, several passes are required, a waste of both time and money. Tow-behind, water filled, cleated rollers have been used to fill the gap between the tracks, however they are difficult to manage due to their excessive weight.

Accordingly, there is a need for a means by which cleating can be performed on landfills and other excavation sites that require erosion prevention in a cheap and efficient manner.

In the related art, several patents describe a soil leveling apparatus or implement for tractors or bulldozers. These include U.S. Pat. No. 5,713,418, issued in the name of Warren et. al., U.S. Pat. No. 5,024,280 issued in the name of Mork, U.S. Pat. No. 4,924,945 issued in the name of Mork, U.S. Pat. No. 4,113,026 issued in the name of Van der Lely et. al. and U.S. Pat. No. 4,098,344 issued in the name of Johnson.

U.S. Pat. No. 4,878,544 issued in the name of Barnhart discloses a roller attachment to the rear of a bulldozer.

Several patents disclose an attachment blade for a bulldozer that works on a hydraulic system. These include U.S. Pat. No. 4,552,226 issued in the name of Platter and U.S. Pat. No. 4,135,583 issued in the name of Becker, U.S. Pat. No. 4,384,620 issued in the name of Uchida et. al. discloses a multi-purpose blade device.

A search of the prior art did not disclose any patents that read directly on the claims of the instant invention. Consequently, a need has been felt for providing an apparatus and method which overcomes the problems cited above.

SUMMARY OF THE INVENTION

It is therefore an object of the present invention to provide an improved pressure adjustable, soil-cleating attachment for front of bulldozers.

Briefly described according to one embodiment of the present invention, a pressure adjustable, soil-cleating attachment for the front of bulldozers is disclosed, designed for erosion control by cleating the ground in the area between the bull dozer tracks, thus facilitating one pass cleating of the entire area under the bull dozer.

The present invention may also be used to crimp straw and when reseeding land. A cleated roller is connected to two support arms, which releasably mount to the bottom of the bulldozer push arm.

A protective shield is connected to each support arm, and covers the upper visible portion of the roller as the roller rotates, thereby reducing flying debris during cleating of the ground. Roller stabilization means are designed to compensate for movement of the support arms as the bottom of the bulldozer blade wears during use.

The present invention is comprised of material selected from the group comprising metal.

It is another object of the present invention to provide a device that creates divots in soil and dirt to prevent soil erosion.

It is another object of the present invention to provide a device that will work well on steep grades, where pull behind rollers will fail.

It is another object of the present invention to provide a device that cleats the ground in the area between the bull dozer tracks, thus facilitating one pass cleating of the entire area under the bull dozer. This feature creates several benefits, including savings of actual track wear of the bulldozer, fuel consumption, man hours, bulldozer maintenance.

It is another object of the present invention to provide a device that can be attached, operated, and detached by one person.

It is another object of the present invention to provide a device that may also be used to crimp straw and when reseeding land.

It is another object of the present invention to provide a device that produces cleat patterns that match those created by the bulldozer.

It is another object of the present invention to provide a device that quickly and easily connects and disconnects to the front of a bulldozer, thus saving time and money.

It is another object of the present invention to provide a device that utilizes the bulldozer's hydraulic system for movement thereof.

It is another object of the present invention to provide a device that is capable of placing variable pressure on the ground to create cleat patterns.

It is another object of the present invention to provide a device that has a strong, durable, design.

It is another object of the present invention to provide a device that is cost effective to manufacture utilizing readily available materials.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, it is essential that some description be given to the manner and practice of functional utility and description of pressure adjustable, soil-cleating attachment for front of bulldozers 10.

The best mode for carrying out the invention is presented in terms of its preferred embodiment, herein depicted within the FIGS. 1 through 7.

1. Detailed Description of the Figures

Figure 1:
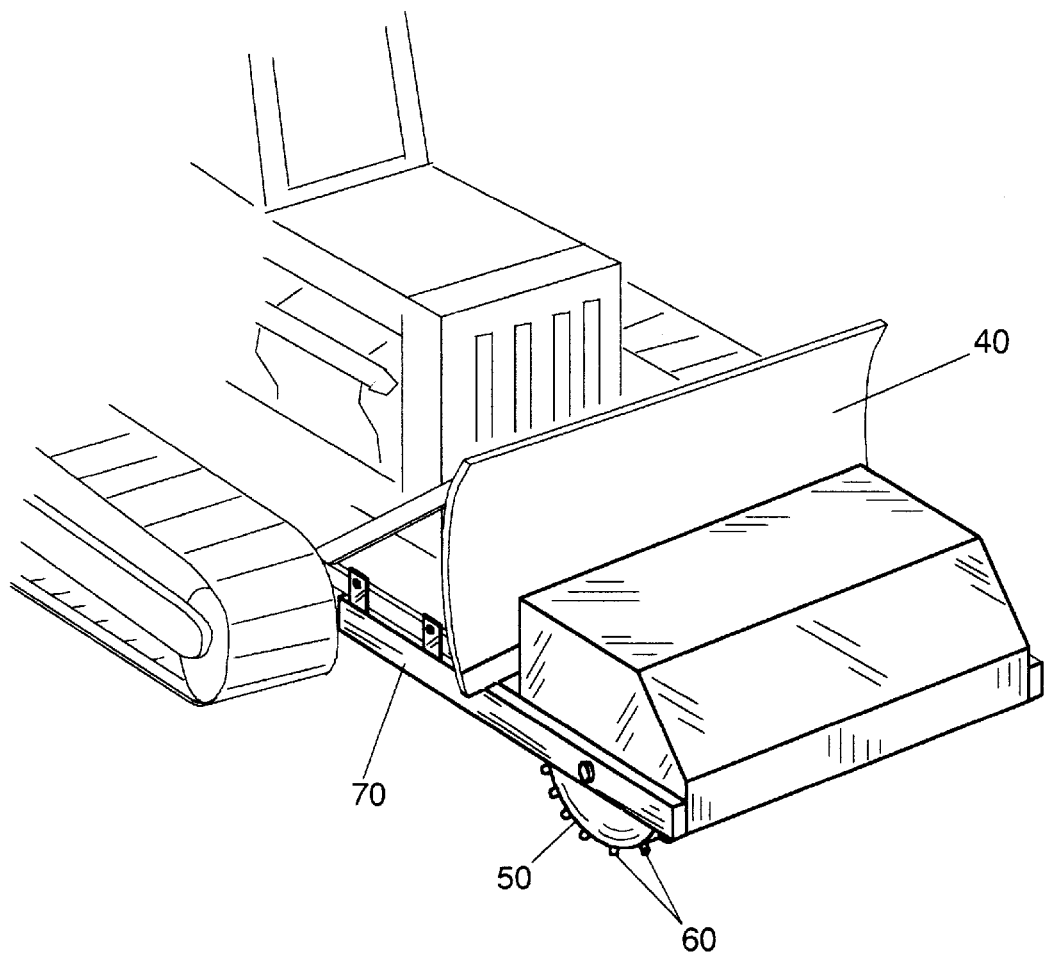
FIG. 1 is a perspective view of the preferred embodiment of pressure adjustable, soil-cleating attachment for front of bulldozers 10, shown attached to a bulldozer.

Referring now to FIG. 1, a pressure adjustable, soil-cleating attachment for front of bulldozers 10 is shown, according to the present invention, is designed for erosion control by cleating the ground in the area between the tracks 30 of a bulldozer 20, thus facilitating one pass cleating of the entire area under the bull dozer. The present invention may also be used to crimp straw and when reseeding land.

The present invention attaches to the front blade 40 of the bulldozer 20, allowing the user to create water-retaining divots in the ground surface between the tracks 30 on the bulldozer 20. A roller 50, of a generally cylindrical configuration, is disclosed.

The exterior circumferential surface of the roller 50 has cleating means 60, such as protrusions or indentations, attached thereto, so as to form cleating patterns in the dirt similar to the cleating patterns created by the bulldozer 20 tracks 30.

Figure 2:
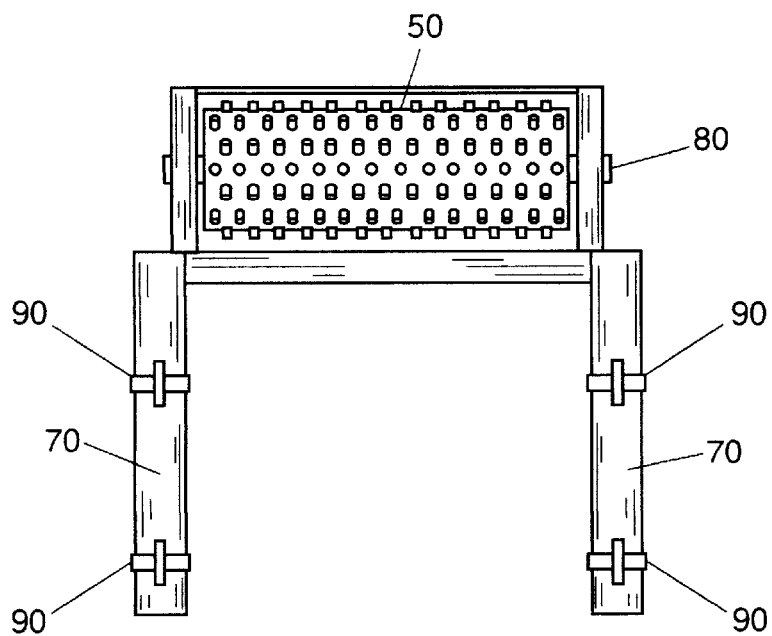
FIG. 2 is a bottom view of the present invention.

Referring now to FIGS. 1 and 2, attached to each end of the roller 50 is a support arm 70 of a linearly elongated, rectangular configuration. The length of the roller 50 along its radial centerline is sufficient to create cleating patterns over the area between the tracks 30 of conventional bulldozers 20. The roller 50 is attached to the two support arms 70 so that the roller 50 has free rotation in an arc of 360 degrees, spinning as the bulldozer 20 moves forward and reverse. Bearings 80, at the connection point of the roller 50 and support arms 70, facilitate smooth rotation of the roller 50. Each support arm 70 extends backward from the roller 50 toward the bulldozer 20, perpendicular to the radial centerline of the roller 50.

Figure 3:
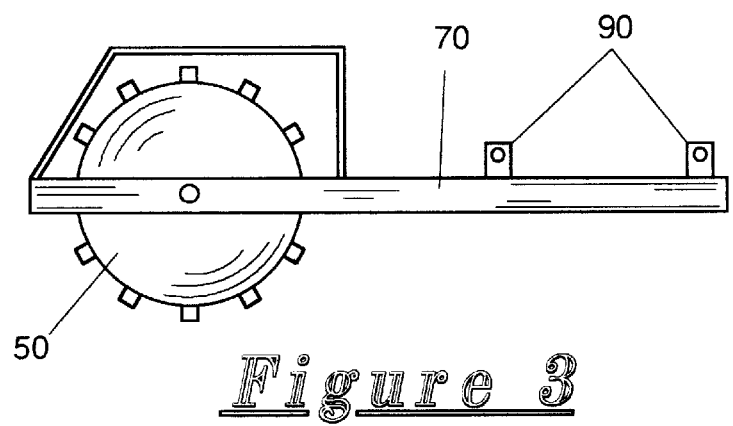
FIG. 3 is a right side view thereof, the left side view being a mirror image of the right side view.
Figure 4:
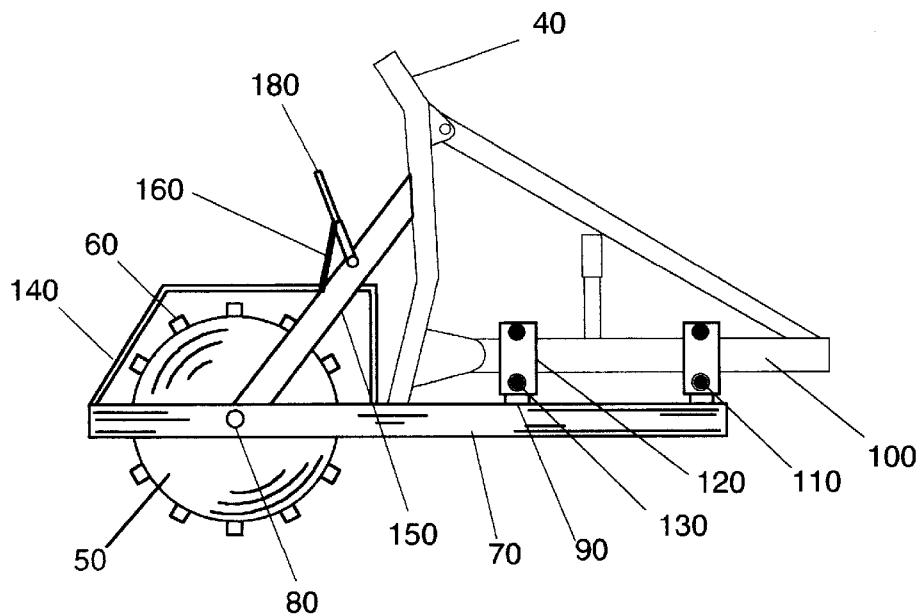
FIG. 4 is a right side view of the present invention attached to the bulldozer.

Referring now to FIGS. 3 and 4, a plurality of support arm attachment means 90, located along the upper surface of each support arm 70, releasably secure each support arm 70 to the lower side of the bulldozer 20 push arm 100. For purposes of disclosure, the support arm attachment means 90 is depicted as hook up pins 110, which pass through connection protrusions 120 located on the upper surface of each support arm 70 and holes 130 in the lower portion of each dozer push arm 100. The connection protrusions 120 are configured to allow the support arm 70 to rest against the bottom of the bulldozer 20 push arm 100.

Referring now to FIGS. 1 and 4, a protective shield 140 is connected to each support arm 70, and covers the upper visible portion of the roller 50 as the roller 50 rotates, thereby reducing flying debris during cleating of the ground. Sufficient clearance between the roller 50 and protective shield 140 reduces the chances of mud getting caught in between the two components.

Figure 5:
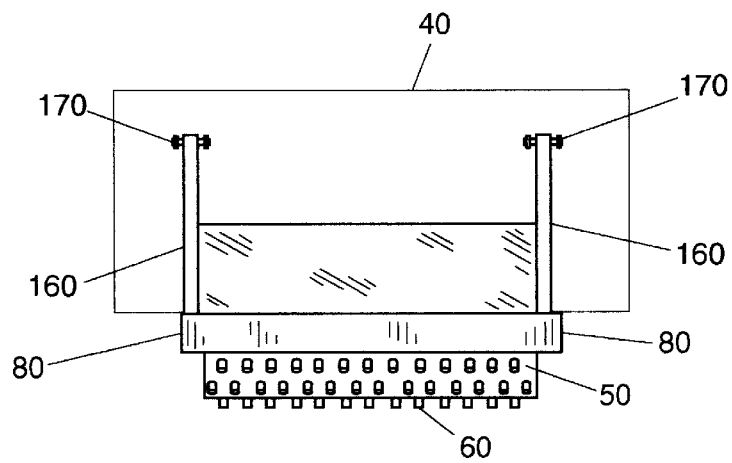
FIG. 5 is a front view of the present invention attached to the bulldozer.

Referring now to FIGS. 1, 4 and 5, roller stabilization means 150 are designed to compensate for movement of the support arms 70 as the bottom of the bulldozer 20 blade 40 wears during use. Since the upper surface of each support arm 70 rests against the bottom of the bulldozer 20 blade 40, using the bulldozer 20 blade 40 as a fulcrum point, as the bulldozer 20 blade 40 wears, the support arms 70 become capable of vertical movement, causing potential slight vibration to the system. The roller stabilization means 150 eliminates this potential vibration.

For purposes of disclosure, the roller stabilization means 150 is depicted as a set of cables 160, attached to each support arm 70 near the connection point of the support arm 70 and the roller 50, and extending to releasably connect to eye bolts 170 already positioned on a traditional bulldozer 20 blade 40. A ratcheting means 180 allows tension on each cable 160 to be adjusted, to compensate for movement of the support arms 70, as they loosen from wear on the bottom of the bulldozer 20 blade 40.

By connecting the support arms 70 to the bulldozer 20 push arm 100, the present invention utilizes the bulldozer 20's hydraulic system to create the pressure under which the cleats are applied rather than filling the roller 50 with water to increase its weight. As such, the present invention is capable of placing variable pressure on the ground to create the cleat patterns.

The present invention is easier to manage because it is lightweight in comparison to the tow-behind version.

Figure 6:
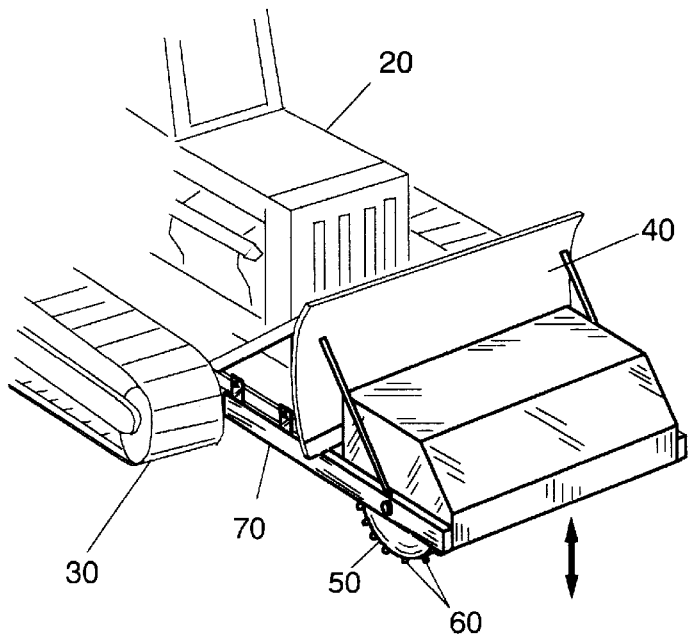
FIG. 6 is a perspective view of the present invention being attached to a bulldozer.

Referring now to FIG. 6, attaching the roller 50 to the bulldozer 20 blade 40 arm is facilitated by the ability to adjust the vertical position of the bulldozer 20 blade 40 arms in order to line up the support arms 70 with the bottom of the bulldozer 20 push arms 100.

The present invention is comprised of material selected from the group comprising metal.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

Figure 7:
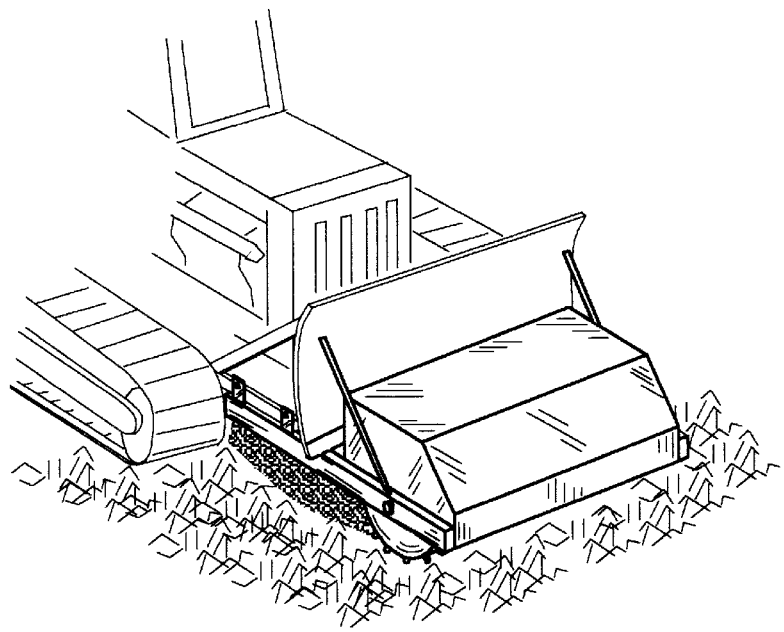
FIG. 7 is an in-use view of the present invention.

Referring now to FIGS. 6 and 7, to use the present invention, the present invention is placed in front of a bulldozer 20. The bulldozer 20 push arm 100 and blade 40 are lifted, and the support arms 70 are placed under the bulldozer 20 push arms 100, and connected to their respective bulldozer 20 push arms 100, via the support arm attachment means 90. The cables 160 are connected to the eye bolts 170 on the bulldozer 20 blade 40, and the ratcheting means 180 is used to tighten the support arms 70 against the bottom of the bulldozer 20 blade 40. The bulldozer 20 blade 40 is then lowered until the desired pressure is placed on the ground from the roller 50. The bulldozer 20 is then driven over the area to be cleated.

When the cleating operation is completed, the bulldozer 20 push arms 100 are raised, the cables 160 are loosed and removed from the eye bolts 170 on the bulldozer 20 blade 40, and the support arms 70 are disconnected from the bulldozer 20 push arms 100. The bulldozer 20 can then be used for normal operations.

The foregoing description is included to illustrate the operation of the preferred embodiment and is not meant to limit the scope of the invention. The scope of the invention is to be limited only by the following claims.

What is claimed is:

1. A pressure adjustable, soil-cleating attachment for the front of bulldozers, comprising:

a roller, of a generally cylindrical configuration, said roller having two ends each forming a connection point and an external circumferential surface area;

cleating means, said cleating means located on said external circumferential surface area of said roller;

two support arms, of a linearly elongated configuration, said support arms connected to said ends of said roller at said connection points;

bearings, said bearings located at the connection point of said roller and support arms, and used to facilitate smooth rotation of said roller;

a plurality of support arm attachment means, located along an upper surface of each support arm, said support arm attachment means designed to releasably secure each support arm to a lower side of bulldozer push arms;

a protective shield, said protective shield connected to each support arm, and covering an upper portion of said roller as said roller rotates; and roller stabilization means, said roller stabilization means designed to compensate for movement of said support arms as the bottom of a bulldozer blade wears during use, wherein said roller stabilization means further comprises a set of cables, said cables attached to each support arm near said connection point of said support arm and said roller, and extending to releasably connecting to eye bolts already positioned on said bulldozer blade; and ratcheting means, said ratcheting means designed to allow tension on each cable to be adjusted.

2. The pressure adjustable, soil-cleating attachment for said front of bulldozers described in claim 1, wherein said support arm attachment means are hook up pins, which pass through connection protrusions located on said upper surface of each support arm and holes in said lower portion of each bulldozer push arm, said connection protrusions configured to allow said support arm to rest against said lower side of said bulldozer push arm.

3. The pressure adjustable, soil-cleating attachment for the front of bulldozers described in claim 1, wherein each support arm extends backward from said roller toward said bulldozer, perpendicular to a radial centerline of said roller.

4. The pressure adjustable, soil-cleating attachment for the front of bulldozers described in claim 1, wherein the length of said roller is sufficient to create cleating patterns over the area between said tracks of conventional bulldozers.

5. The pressure adjustable, soil-cleating attachment for the front of bulldozers described in claim 1, wherein said attachment utilizes a hydraulic system to create the pressure under which said cleating means are applied to the ground.

6. The pressure adjustable, soil-cleating attachment for the front of bulldozers described in claim 1, wherein said attachment is capable of placing variable pressure on the ground to create cleat patterns without adjustment to the configuration or components of said attachment.

7. The pressure adjustable, soil-cleating attachment for the front of bulldozers described in claim 1, wherein said attachment is small, compact and lightweight, in comparison to a tow-behind device.

8. The pressure adjustable, soil-cleating attachment for the front of bulldozers described in claim 1, wherein said attachment may be attached to bulldozer blade arms by raising said bulldozer blade arms and adjusting the position of said bulldozer blade arms in order to line-up said support arms with said bottom of said bulldozer push arms.

9. The pressure adjustable, soil-cleating attachment for the front of bulldozers described in claim 1, wherein said attachment is designed for erosion control by cleating said ground in the area between the bulldozer tracks, thus facilitating one pass cleating of said entire area under said bulldozer.

* * * * *